(12) United States Patent
Lowance (10) Patent No.: US 7,404,497 B2
(45) Date of Patent: Jul. 29, 2008

(54) DUAL CONTAINER SYSTEM AND METHOD OF MANUFACTURING THE SAME

(76) Inventor: Philip D. Lowance, 25121 Via Elevado, Dana Point, CA (US) 92629

( * ) Notice: Subject to any disclaimer, the term of this patent is extended or adjusted under 35 U.S.C. 154(b) by 163 days.

(21) Appl. No.: 10/959,754

(22) Filed: Oct. 6, 2004

(65) Prior Publication Data

US 2005/0040167 A1    Feb. 24, 2005

Related U.S. Application Data (63) Continuation of application No. 10/614,438, filed on Jul. 3, 2003, now Pat. No. 7,025,924.

(51) Int. Cl.
*A47G 19/00* (2006.01)
*B65D 21/02* (2006.01)

(52) U.S. Cl. .................................. 220/23.4
(58) Field of Classification Search ............ 215/6; 220/23.4, 23.83, 23.86; 206/514
See application file for complete search history.

(56) References Cited

U.S. PATENT DOCUMENTS

| | | | |
|---|---|---|---|
| 251,566 A | 12/1881 | Fuller | |
| 519,601 A | 5/1894 | Dryfoos | |
| 849,211 A | 4/1907 | Daly | |
| D100,412 S | 7/1936 | Carp | |
| 2,374,092 A | 4/1945 | Glaser | |
| 2,493,922 A | 1/1950 | Miller | |
| 2,780,225 A | 2/1957 | Barr et al. | |
| 3,225,951 A * | 12/1965 | Poston et al. | 215/6 |
| D219,642 S | 1/1971 | Prahs | |
| D220,864 S | 6/1971 | Wechman | |
| 3,590,989 A | 7/1971 | Witter | |
| 4,235,343 A | 11/1980 | Thompson | |
| D270,429 S * | 9/1983 | Anderson et al. | D9/531 |
| 4,640,423 A | 2/1987 | Mednis | |
| 4,673,094 A | 6/1987 | Mednis | |
| 4,708,253 A | 11/1987 | Mednis | |
| D303,087 S * | 8/1989 | Gendron | D9/531 |

(Continued)

FOREIGN PATENT DOCUMENTS

DE        729092        12/1942

(Continued)

*Primary Examiner*—Anthony Stashick
*Assistant Examiner*—Harry A Grosso
(74) *Attorney, Agent, or Firm*—InTech IP Law Group; Sean O'Neill (57) ABSTRACT

There is provided a container system adapted to withstand a single impact or repeated impacts. The container system features a first container having a first container body. The container system further features a second container which has a second container body. The second container defines a second body height and a second body wall thickness. A body recess which is adapted to releasibly engage the first container body of the first container is formed on the second container body and is extended along the second body height. The body recess defines at least one recess bottom corner having a recess bottom corner wall thickness which is at least identical to the second body wall thickness of the second container body. This specified bottom corner wall thickness of the body recess allows the second container to withstand the single impact or repeated impacts.

11 Claims, 3 Drawing Sheets

U.S. PATENT DOCUMENTS

| | | | | |
|---|---|---|---|---|
| 4,903,854 A | * | 2/1990 | Schiemann | 220/772 |
| 4,925,066 A | | 5/1990 | Rosenbaum | |
| 4,950,083 A | * | 8/1990 | Bavaveas | 366/348 |
| 5,065,875 A | * | 11/1991 | Balavich | 215/10 |
| 5,316,398 A | * | 5/1994 | Chandaria et al. | 401/18 |
| 5,989,661 A | * | 11/1999 | Krishnakumar et al. | 428/35.7 |
| 6,206,218 B1 | * | 3/2001 | Young et al. | 220/23.4 |

FOREIGN PATENT DOCUMENTS

| | | | |
|---|---|---|---|
| FR | 237105 | | 12/1976 |
| FR | 2598393 A | * | 11/1987 |
| IT | 301579 | | 11/1954 |
| NL | 34758 | | 1/1934 |

\* cited by examiner

DUAL CONTAINER SYSTEM AND METHOD OF MANUFACTURING THE SAME

CROSS-REFERENCE TO RELATED APPLICATIONS

This application is a continuation of U.S. application Ser. No. 10/614,438 entitled DUAL CONTAINER SYSTEM AND METHOD OF MANUFACTURING THE SAME filed Jul. 3, 2003 now U.S. Pat. No. 7,025,924, the entire contents of which are hereby incorporated by reference.

STATEMENT RE: FEDERALLY SPONSORED RESEARCH/DEVELOPMENT

Not Applicable

BACKGROUND OF THE INVENTION

The present invention relates generally to dual container systems, and more particularly to an improved dual container system featuring an impact-resistant container which possesses one uniform wall thickness throughout the entirety of its body and provides a unique horizontal support for its counterpart container that engages therewith.

It is a common practice for manufacturers and/or retailers to employ the use of containers for packaging their products and making them available in the marketplace. These containers not only protect the products from contamination, but may further facilitate the use of the products. Indeed, the significance and importance of providing user-friendly containers are truly appreciated by various industries as they can increase the overall attractiveness and appeal of the products in the marketplace.

One notable type of user-friendly container currently in use is the dual container system which typically allows large and small containers to be cooperatively engaged with each other. Dual container systems offer the convenience and freedom of product mobility as the smaller container can always be disengaged from the larger container and accompany the consumer.

To illustrate this point by way of an example, the dual container system may be adapted for frequent traveling as the smaller container containing a product such as shampoo or soap may be taken along. This obviously eases the size of the load that the traveler has to carry. Of course, the larger container can be left behind and provide all the functions of a traditional container when the traveler returns home.

Although the current dual container systems may achieve their primary objective of product user-friendliness, they possess certain deficiencies which detract from their overall utility. Perhaps the greatest deficiency of the conventional dual container systems is the inability to withstand repeated or repetitive impacts originating from their environment. The dual container systems of the conventional art are frequently subjected to tear and/or rupture as many of them are repeatedly dropped and/or mishandled during their shipment and/or storage.

In particular, the recess of the larger container which is used for engaging the smaller container is vulnerable to tear and/or rupture as its edges forming the outer boundaries thereof are not sufficiently thickened. Even more vulnerable than the recess edges are the corners formed on the bottom portion the recess. More particularly, these bottom corners of the recess are extremely thin compared to the other portions of the larger container. This is understood to be a result of manufacturing deficiency in which insufficient amounts of preform materials are distributed to that region.

As such, while the rest of the larger container is uniformly thickened to a sufficient degree, it is often the case that the bottom corners of its recess fail to reach the same, or even similar, thickness. In this regard, the bottom recess corners are especially prone to being torn or ruptured. Obviously, this has the inevitable negative effect of spilling or discharging some, if not all, of the products contained within the larger container. The product loss resulting from such structural failure may become burdensome when translated into dollars and cents in loss profits.

Another significant deficiency that casts a shadow upon the dual container systems of the conventional art is the inability of the larger container to provide an adequate horizontal support for the smaller container. Although various container systems may provide certain individualistic mechanisms for engaging the smaller container, they all essentially follow the same guideline of trapping or capturing the smaller container within the recess through the use of a compressive force.

However, those mechanisms cannot account for certain situations such as the smaller container being inadvertently slipped out through the underside of the recess due to the force of gravity. This scenario is more likely to happen as the time goes on since the mechanisms for engaging the smaller container would eventually become weakened. As such, the risk of container slippage is a possibility which can detrimentally undermine the overall utility and value of the dual container system.

In view of the above-described shortcomings of the conventional dual container systems, there exists a clear need in the art for an improved dual container system which has a sufficient structural integrity to withstand a single significant impact and/or repeated impacts that are undesirably imposed thereon. Moreover, there exists a further need in the art for an improved dual container system that can provide an adequate horizontal support to its smaller container so as to prevent any inadvertent slippage from underneath the recess of the larger container.

BRIEF SUMMARY OF THE INVENTION

The present invention specifically addresses and alleviates the above-referenced deficiencies associated with the dual container systems of the prior art. More specifically, the present invention is an improved dual container system which is specially designed and manufactured to withstand a single impact or repeated impacts undesirably caused thereupon. This prevents the present container system from tearing or rupturing at any specific portions thereof so as to effectively contain its associated product (e.g., shampoo, body wash, candies, toys, pet food, detergent, etc.) therewithin. In addition to this beneficial characteristic, the improved dual container system of the present invention provides a unique horizontal support for its smaller container to prevent any problems associated with inadvertent slippage as amply described above.

In accordance with a preferred embodiment of the present invention, the dual container system first features a first container (i.e., smaller container) having a first container body. The dual container system of the present invention further features a second container (i.e., larger container) which has a second container body. The second container defines a second body height, a second body wall thickness and two opposing second body sides.

In the preferred embodiment, the second container body is fabricated from a plastic material and has a generally cylindrical configuration. The second container body preferably has proximal and distal parting lines. More particularly, the proximal and distal parting lines are formed on respective ones of the opposing second body sides and are extended along the second body height.

In the preferred embodiment of the present invention, there is provided a body recess which is adapted to releasibly engage the first container body of the first container. More specifically, the body recess is formed on the second container body and is extended along the second body height. The body recess defines at least one recess bottom corner having a recess bottom corner wall thickness.

In the preferred embodiment, there are two recess bottom corners. Each of the recess bottom corner wall thicknesses are at least identical to, if not greater than, the second body wall thickness of the second container body. These specified bottom corner wall thicknesses of the body recess allow the second container to withstand the single impact or repeated impacts caused thereupon. The second body wall thickness and the recess bottom corner wall thicknesses preferably range between about 0.01 inches and 0.2 inches. Preferably, the body recess is angularly offset approximately 90° from each of the body parting lines.

In accordance with the preferred embodiment of the present invention, the body recess is sized and configured to accommodate only a portion of the first container body. In this respect, a remaining portion of the first container body becomes exposed outside the body recess and protrudes outward beyond the second container body.

The second container body preferably includes a plurality of lateral body extensions. Each of the lateral body extensions are extended generally perpendicular to the second body height. In addition, each of the lateral body extensions are further extended partially into the body recess. By such configuration, the lateral body protrusions can capture and retain the accommodated portion of the first container body within the body recess.

In the present invention, the second container body may include a handle which extends along the body height. In the preferred embodiment, the handle is substantially aligned with the proximal parting line and is disposed substantially opposite from the distal parting line. Preferably, the handle is angularly offset approximately 90° from the body recess.

The second container body may also include a supporting shelf. In the preferred embodiment, the supporting shelf is extended generally perpendicular to the second body height. Moreover, the supporting shelf is further extended within the body recess adjacent to the at least one recess bottom corner. By such configuration, the supporting shelf can support the accommodated portion of the first container body thereupon.

In accordance with a preferred embodiment of the method of the present invention, there is provided a method of manufacturing a container system with an injection control unit. The injection control unit has an injection unit body and an expandable molding balloon. The present method first includes the step of forming a first container of the container system. The method of the present invention also includes the step of forming a second container of the container system. The second container has two opposing parting lines and a second body wall thickness.

In order to form the second container of the present invention, a preform material is injected into the injection control unit. The preform material is preferably a plastic material. More specifically, the injection control unit provides an openable/closeable injection gap between its injection unit body and the injection control member. The preform material is injected into the injection control unit through the injection gap when it is opened.

Thereafter, the injection control member of the injection control unit is strategically moved with respect to the injection unit body. This is to regulate a flow of the preform material to the expandable molding balloon. In the preferred embodiment of the present invention, the injection control member has a generally oval configuration.

For strategic movement of the injection control member, the injection control unit is first set or programmed to account for a plurality of points where the second body wall thickness could undesirably change. The injection control member is then moved in upward and downward directions relative to the injection unit body based upon the presetting or preprogramming thereof. This selectively accesses the injection gap which is provided between the injection control member and the injection unit body in order to control the flow of the preform material to the expandable molding balloon.

The method of the present invention further features the step of expanding the expandable molding balloon so as to mold the preform material into the second container. In this process, a body recess which is adapted to releasibly engage the first container is formed and extended upon the second container. Preferably, the body recess is angularly offset approximately 90° from each of the parting lines.

A handle may be extended upon the second container. Preferably, the handle is disposed in substantial alignment with one of the parting lines and is further disposed substantially opposite from the other parting line. Further preferably, the handle is angularly offset approximately 90° from the body recess. A supporting shelf may also be provided for supporting the first container thereupon. The supporting shelf is preferably extended within the body recess adjacent to the at least one recess bottom corner.

The method of the present invention also includes the step of thickening the at least one recess bottom corner of the body recess. This is to ensure that its recess bottom corner wall thickness is at least identical to, if not greater than, the second body wall thickness. More particularly, at least one injection scallop is formed about an outer control periphery of the injection control member. The at least one injection scallop is essentially designated for forming the body recess of the second container.

By providing the at least one injection scallop, the flow of the preform material to selected portions of the expandable molding balloon may be increased. As such, the at least one recess bottom corner which is thickened at least identical to the second body wall thickness may be derived. Due to the specified bottom corner wall thickness of the body recess, the second container may withstand the single impact or repeated impacts undesirably caused thereupon.

BRIEF DESCRIPTION OF THE DRAWINGS

These as well as other features of the present invention will become more apparent upon reference to the drawings wherein.

DETAILED DESCRIPTION OF THE INVENTION

Figures 1, 2, 3, 4:
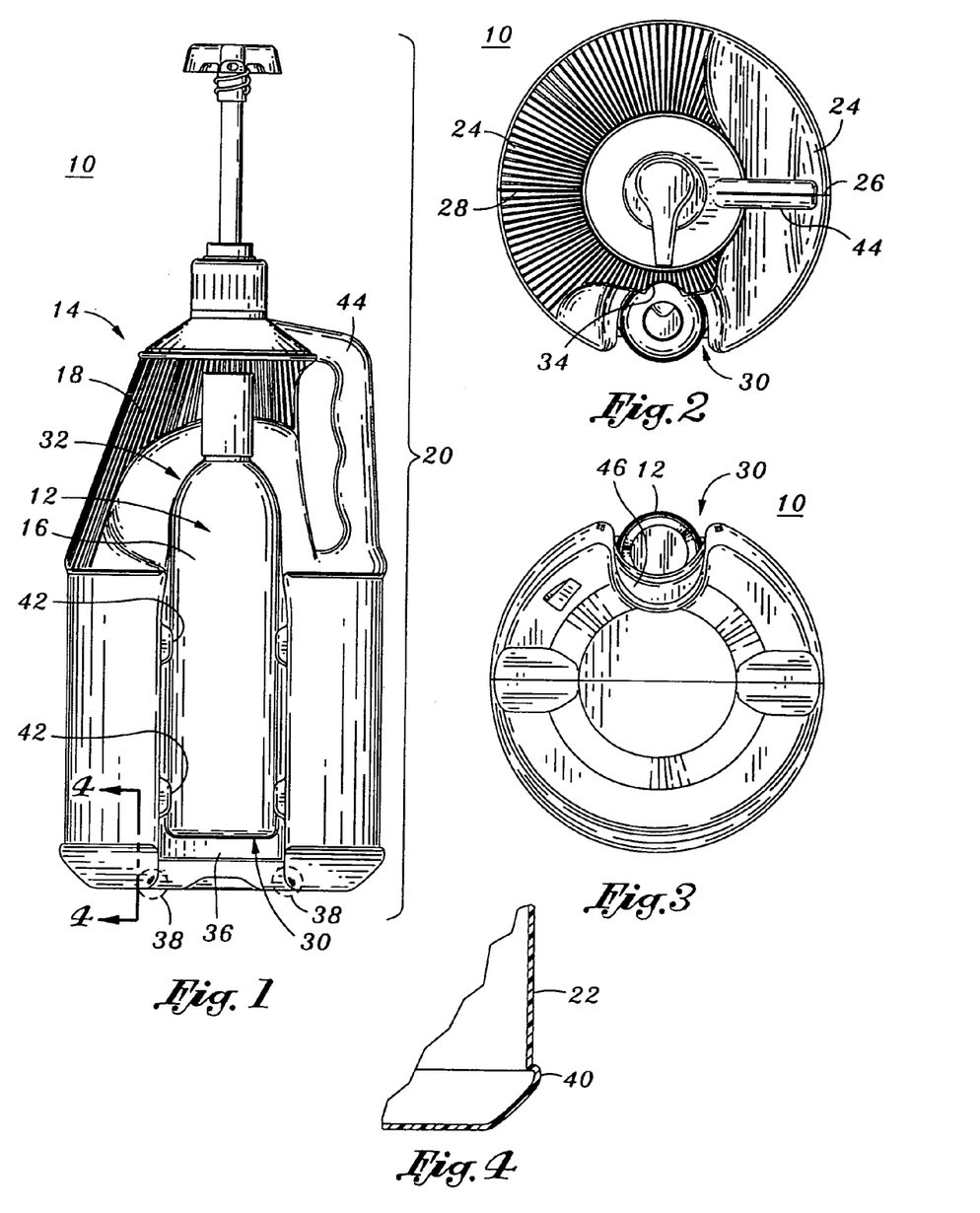
FIG. 1 is a side view of a dual container system constructed in accordance with a preferred embodiment of the present invention and illustrating its second container which is adapted to accommodate and engage its first container via a body recess formed thereon.
FIG. 2 is a top plan view of the dual container system shown in FIG. 1 and illustrating the body recess of its second container which is angularly offset about 90° from a handle and body parting lines thereof.
FIG. 3 is a bottom plan view of the dual container system shown in FIG. 1 and illustrating a supporting shelf which is formed and extended within the body recess of its second container for supporting its first container thereupon.
FIG. 4 is a partial cross-sectional view of the second container shown in FIG. 1 to illustrate one uniform wall thickness between its second container body and recess bottom corners.
Figures 5, 6, 7, 8:
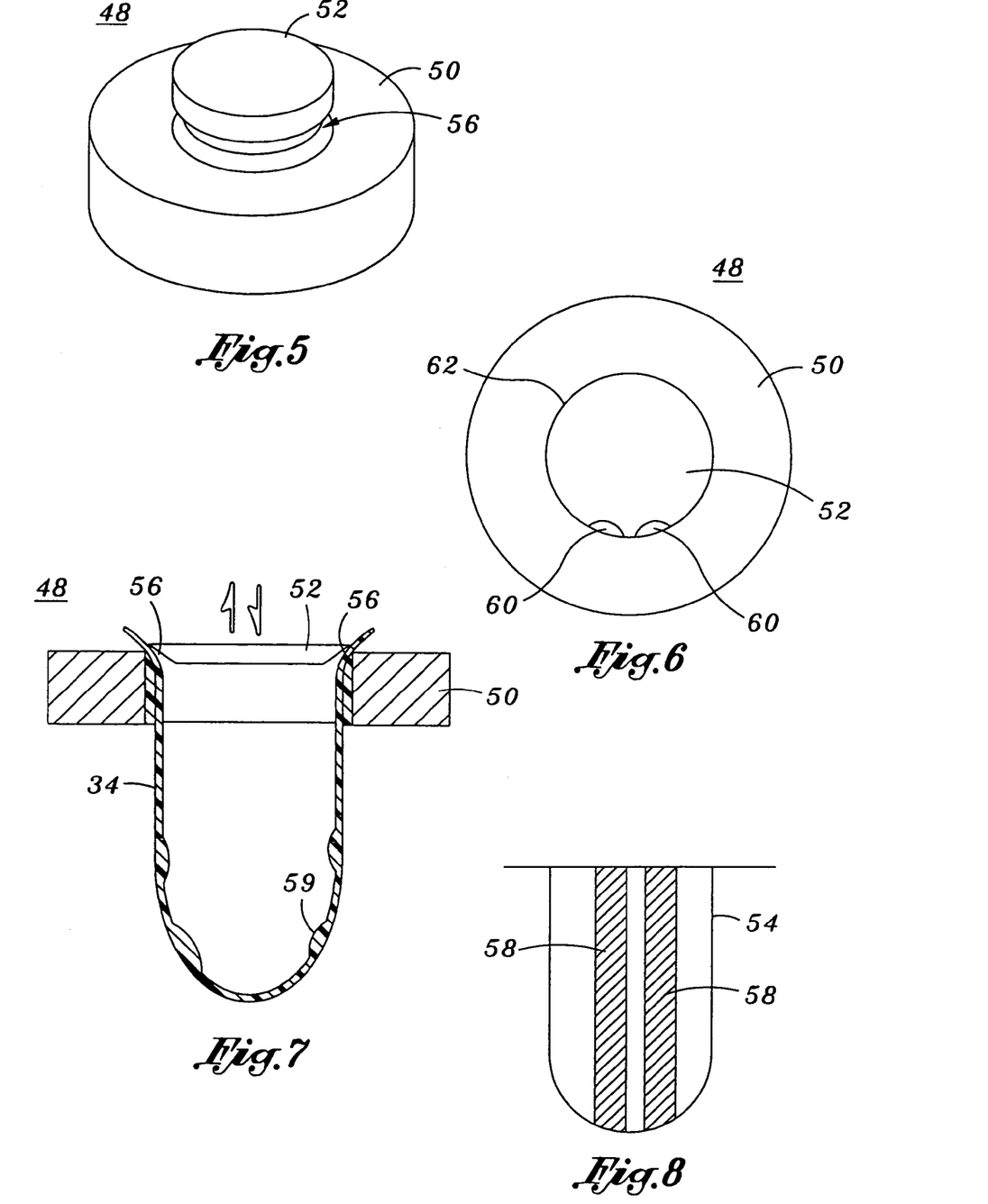
FIG. 5 is a perspective view of an injection control unit of a blow molding machine which is utilized for manufacturing the present dual container system of FIG. 1.
FIG. 6 is a top plan view of the injection control unit shown in FIG. 5 and illustrating its injection control member which provides two injection scallops designated for forming the body recess of FIG. 1.
FIG. 7 is a cross-sectional view of the injection control unit shown in FIG. 5 and illustrating its injection control member which is sized and configured for strategic movement with respect to an injection unit body so as to regulate material flow to an expandable molding balloon.
FIG. 8 is a cross-sectional view of the expandable molding balloon shown in FIG. 7 to illustrate thicker material flow resulting from the two injection scallops of FIG. 6.
Figure 9:
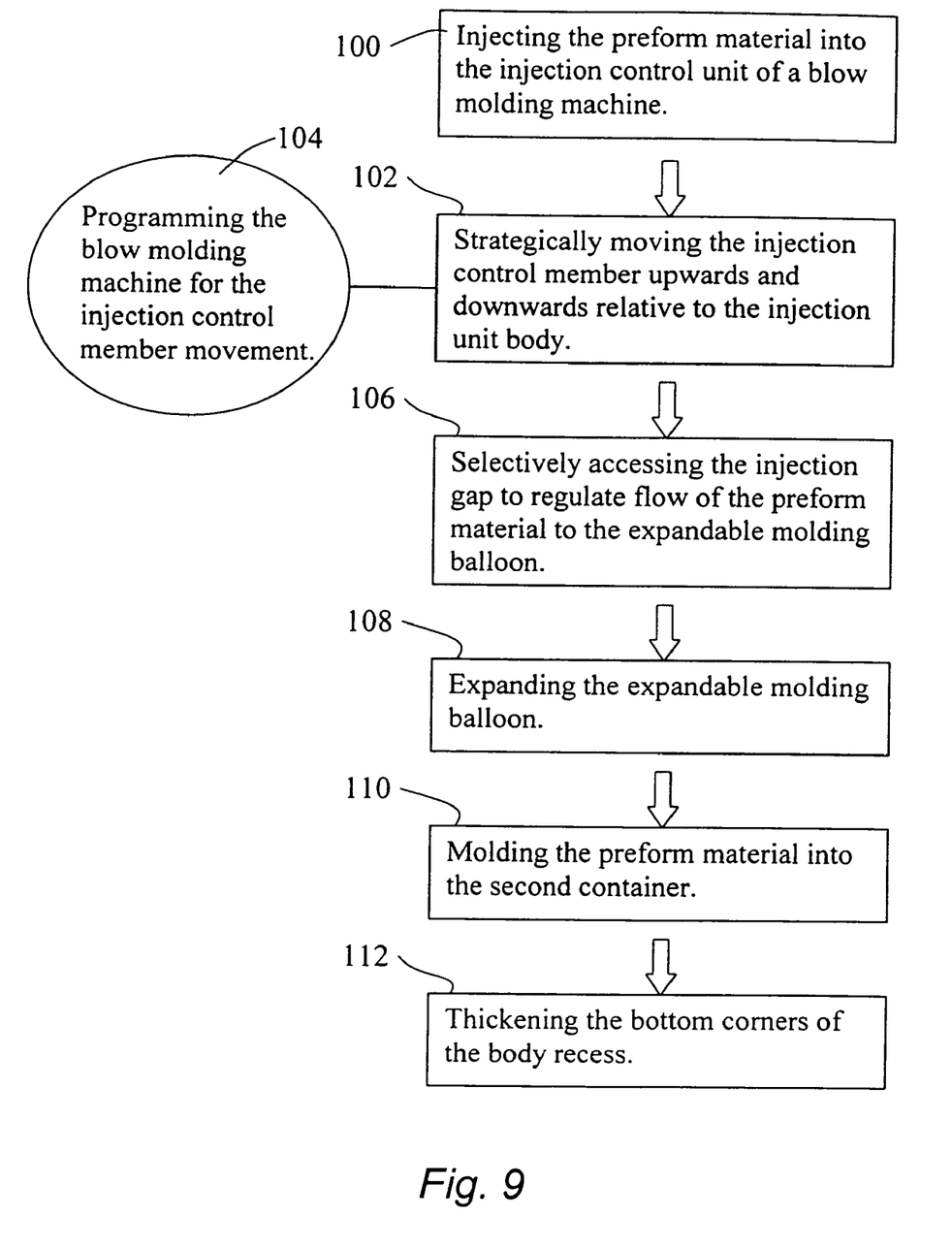
FIG. 9 is a flow diagram which depicts the essential manufacturing steps in forming the present dual container system of FIG. 1.

Referring now to the drawings wherein the showings are for purposes of illustrating preferred embodiments of the present invention only, and not for purposes of limiting the same, FIG. 1 illustrates a dual container system 10 constructed in accordance with a preferred embodiment of the present invention. Similar to its prior art counterparts, the dual container system 10 of the present invention is configured to offer the convenience and freedom of product mobility by providing an overall system in which a first container 12 (i.e. smaller container) can be engaged and disengaged from a second container 14 (i.e., larger container). However, unlike its prior art counterparts, the present dual container system 10 possesses one uniform wall thickness throughout the entirety of its body so as to be impact-resistant and further provides a unique horizontal support for accommodating the first container 12 when it engages the second container 14. These features will be better explained shortly below.

The first and second containers 12, 14 are manufactured and utilized for accommodating and containing various products (e.g., shampoo, body wash, candles, toys, pet food, detergent, etc.) therewithin. In this regard, the first and second containers 12, 14 may be formed to have a variety of shapes, configurations, geometries and textures which are sufficient for accommodating and containing such products. Although the containers 12, 14 comprising the dual container system 10 of the present invention may be fabricated from any material that can provide rigidity or semi-rigidity, it is preferred that they are made from a plastic material such as high-density polyethylene plastic.

Referring more particularly to FIGS. 1-3, as the first and second containers 12, 14 may be any general desired shape, it is understood that the containers 12, 14 as depicted are symbolic in nature. As discussed above, it is the inventive concepts of providing one impact-resistant uniform thickness and horizontal support that should be appreciated. However, the first and second containers 12, 14 are each depicted as having a generally cylindrical configuration of differing sizes. In other words, they are each shaped like a bottle container, with the second container 14 being larger in size than the first container 12. Of course, such sizing is inevitable as the second container 14 is provided to engage and support the first container 12.

Referring now back to FIG. 1, the first container 12 of the present dual container system 10 has a first container body 16. Likewise, the second container 14 has a second container body 18. Although the following pages are devoted mostly to describing the unique specifications of the second container body 18 as it is the second container body 18 which is often subjected to tear and rupture, one of ordinary skill in the art will recognize that the first container body 16 may be manufactured to closely resemble and adhere to the specifications of the second container body 18. Alternatively, however, the first container body 16 may be made in accordance with conventional knowledge of manufacture and does not absolutely have to follow the unique specifications of the second container body 18.

Referring now to FIGS. 1-4, the second container body 18 defines a second body height 20, a second body wall thickness 22 and two opposing second body sides 24. The second container body 18 also has a proximal parting line 26 and a distal parting line 28. More specifically, the proximal and distal parting lines 26, 28 are defined on respective ones of the opposing second body sides 24 and are extended along the second body height 20 of the second container body 18.

Importantly, the second container body 18 forms a body recess 30 which is adapted to releasibly engage the first container body 16 of the first container 12. In particular, the body recess 30 is formed on the second container body 18 and is extended along the second body height 20 thereof. The body recess 30 defines a recess top portion 32 which is designed to expose the first container body 16 therethrough when it engages the body recess 30. Optionally, the second container body 18 may have a finger-indent 34 adjacent the recess top portion 32 for facilitating the detachment of the first container body 16 from the body recess 30 (best shown in FIG. 2). Opposite from the recess top portion 32 along the second body height 20 is defined a recess bottom portion 36 of the body recess 30. The recess bottom portion 36 includes two recess bottom corners 38 each defining a recess bottom corner wall thickness 40, the significance of which will be described shortly (best shown in FIGS. 1 and 3).

As illustrated in FIG. 4, each of the recess bottom corner wall thicknesses 40 are identically thickened as the second body wall thickness 22 of the second container body 18. These specified bottom corner wall thicknesses 40 of the body recess 30 allow them to withstand a single impact or repeated impacts caused thereupon, at least to the same degree or extent as the rest of the second container body 18. As this is the primary objective of the present invention, it is contemplated herein that the recess bottom corner wall thicknesses 40 may be greater than the second body wall thickness 22 of the second container body 18. In the preferred embodiment of the present invention, the second body wall thickness 22 and the recess bottom corner wall thicknesses 40 preferably range from about 0.0005 inches to about 0.5 inches, and more preferably from about 0.01 inches to about 0.2 inches.

Referring now back to FIGS. 1-3, the body recess 30 is preferably formed in an angular offset from the proximal and distal parting lines 26, 28 of the second container body 18. In particular, the preferred angular offsetting of the body recess is approximately 90° from each of the body parting lines 26, 28. This specified angular offsetting of the body recess 30 provides a sufficient distance from each of the body parting lines 26, 28 where the two body halves come together to form the second container body 18. This allows the body recess 30 to better remain intact, and hence maintaining the structural integrity of the wall thicknesses 22, 40 throughout the second container 14 after being impacted singly or multiply by an undesired factor in its external environment.

Further advantage lies in that such positioning allows the plastic material to stretch properly when it is blown and prevents the general corners/edges of the second container body 18 from becoming too thin after being molded. Simply put, this specified positioning is the most efficient accommodation of the body recess 30 and ensures that the second container 14 is fabricated optimally. It is foreseeable that a second or additional body recess may be optionally formed on the second container body 18 substantially opposite from the already provided body recess 30.

The body recess 30 formed along the second container body 18 is sized and configured to engage and accommodate only a selected portion of the first container body 16 therewithin. In this respect, a remaining portion of the first container body 16 that is not engaged and accommodated becomes exposed outside the body recess 30 and protrudes outward beyond the second container body 18. However, it should be noted herein that the body recess 30 may be optionally deepened further to accommodate the first container body 16 completely therewithin.

Although various methods and devices may be used for engaging and accommodating the first container body 16, a plurality of lateral body extensions 42 are preferably provided by the second container body 18 to be used for this purpose. More specifically, each of the lateral body extensions 42 are extended generally perpendicular to the second body height 20 and partially into the body recess 30. By such configuration, the lateral body protrusions 42 can capture and retain the accommodated portion of the first container body 16 within the body recess 30. In other words, the first container 12 may be snapped into the body recess 30 wherein each of the lateral body protrusions 42 would operate to apply either a frictional or compressive force upon the first container body 16 for retention.

FIGS. 1 and 2 show a handle 44 which is extended along the second body height 20 of the second container body 18. Preferably, this handle 44 is substantially aligned with the proximal parting line 26 and is disposed substantially opposite from the distal parting line 28. Further preferably, the handle 44 of the second container body 18 is angularly offset approximately 90° from the body recess 30 for the reasons related to providing better structural integrity that can withstand unwanted external impacts. Moreover, this specific positioning of the handle 44 allows the plastic material to stretch properly when it is blown and is the most efficient manner of accommodating the handle 44.

Referring particularly to FIGS. 1 and 3, the second container body 18 preferably includes a supporting shelf 46. In the preferred embodiment of the present invention, the supporting shelf 46 is extended generally perpendicular to the second body height 20 of the second container body 18. Further to such requisite specification, the supporting shelf 46 is extended around and within the body recess 30 adjacent to the recess bottom corners 38 thereof. By providing such specially formed shelf 46, the accommodated portion of the first container body 16 may be supported upon the supporting shelf 46 of the second container body 18. This would clearly prevent any inadvertent or unintentional slipping of the first container body 16 from underneath the body recess 30 of the second container body 18.

With the structures of the present dual container system 10 now defined, its method of manufacture can be clearly described in view of FIGS. 5-9 provided herein. In order to manufacture the dual container system 10 as specified above, the first container 12 of the container system 10 is first formed, preferably through a plastic blow molding process. As stated above, the first container 12 may be manufactured in the similar manner as the second container 14 as will be described shortly below, or manufactured in accordance with conventional modes of plastic blow molding process. This is because it is the second container 14 which is the component of the overall dual container system 10 that is often subjected to tear and rupture during its shipment, storage or handling.

Next is the step of forming the second container 14 of the container system 10, preferably also through a plastic blow molding process. More particularly, to form the second container 14, a preform material 58 (i.e., high-density polyethylene plastic) is first injected into the injection control unit of a blow molding machine (step 100). Various customized blow molding machines may be used for this purpose. One exemplary machine which may be used is the blow molding machine model # BW 6000 DE from Uniloy Milacron, Inc. of Calif., U.S.A. More specifically, the blow molding machine comprises a customized injection control unit 48. This customized injection control unit 48 is formed essentially of an injection unit body 50, an injection control member 52 and an expandable molding balloon 54 which is extended and disposed within the injection unit body 50 (best shown in FIG. 7).

The customized version of the injection control unit 48 is adapted to provide an openable/closeable injection gap 56 between its injection unit body 50 and the injection control member 52. The preform material 58 is injected into the injection control unit 48 through the injection gap 56 when it is opened. Thereafter, the injection control member 52 of the injection control unit 48 is strategically moved up and down with respect to the injection unit body 50 to open, close and/or vary the size of the injection gap 56 (step 102). This is to regulate the flow of the preform material 58 through the injection gap 56 and to the expandable molding balloon 54. In the preferred embodiment of the present invention, the injection control member 52 has a generally oval configuration and creates the injection gap 56 around its oval periphery. The oval shape in itself exclusive of the scallops 60 will provide a greater flow in strategic areas of the molding balloon 54, thus thickening the molding balloon 54 in those areas vertically (best shown in FIG. 8).

Although the oval configuration is preferred, it should be noted herein that other types of configuration are also workable with the methodology of the present invention. For instance, the injection control member 52 may be more or less rounded such that when it is brought to the injection unit body 50, they collectively define a slightly different shaped injection gap 56 than the one provided by the oval configuration. This may affect the flow to the molding balloon 54 but nonetheless provides the desired flow in strategic areas of the molding balloon 54. In addition to such alternative shapes of the injection control member 52, it is also recognized herein that the injection control member 52 may be shifted toward one particular side of the injection unit body 50 so as to define different variations of the injection gap 56 which will produce the desired flow.

To conduct such strategic movement of the injection control member 52, the blow molding machine and its injection control unit 48 is first set or programmed to account for a plurality of points where the second body wall thickness 22 of the second container body 18 could undesirably change (step 104), possibly to extreme stretching of the molding balloon 54 due to the shape of the body recess 30. In order to exemplify this concept, the blow molding machine is programmed in approximately 100 points where thickness of the second container body 18 may change, and to account for such undesirable thickness changes. Based upon this presetting or pre-programming of the blow molding machine, the injection control member 52 is then moved selectively and strategically in upward and downward directions relative to the injection unit body 50 (step 102). This selectively accesses the injection gap 56 which is provided between the injection control member 52 and the injection unit body 50 in order to control the flow of the preform material 58 to the expandable molding balloon 54 (step 106).

The manufacturing method further includes the step of expanding the molding band 59 in the molding balloon 54 so as to mold the preform material 58 into the second container 14 of the present dual container system 10 (steps 108 and 110). In this process, the body recess 30 is formed and extended upon the second container 14. As mentioned above the body recess 30, and more particularly its recess bottom corners 38, are at least thickened the same as the rest of the second container body to increase its overall structural integrity (step 112).

In order to derive such corners 38, the flow of the preform materials 58 designated for forming the recess bottom corners 38 may be increased to the expandable molding balloon 54. This is possible due to the injection scallops 60 and the ovality formed at the outer periphery 62 of the injection control member 52. Preferably, there are two injection scallops 60, each being designated for forming an edge of the of the body recess 30. By providing these injection scallops 60, the flow of the preform material 58 to selected portions of the expandable molding balloon 54 which are adapted to form the recess bottom corners 38 may be increased. As such, the recess bottom corners 38 which are thickened at least identical to the second body wall thickness 22 of the second container 14 may be derived. In addition, the body recess 30 is angularly offset approximately 90° from each of the parting lines 26, 28.

Also in the expanding and molding process (steps 108 and 110), the handle 44 may be extended upon the second container 14. As noted above, the handle 44 is disposed in substantial alignment with one of the parting lines 26 and is further disposed substantially opposite from the other parting line 28. The handle 44 should also be formed to be angularly offset approximately 90° from the body recess 30.

Further in those steps, the supporting shelf 46 is also provided for supporting the first container 12 thereupon. As indicated above, the supporting shelf 46 is preferably extended within the body recess 30 adjacent to its recess bottom corners 38.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A container system adapted to withstand an impact, the container system comprising:
    a first container having a first container body; and
    a second container, comprising:
        a second container body having a second body height and a second body wall thickness;
        a body recess adapted to releasibly engage the first container body of the first container, the body recess being formed on the second container body and extending along the second body height, the body recess defining a recess bottom portion including a pair of recess bottom corners each having a recess bottom corner wall thickness which is at least identical to the second body wall thickness of the second container body, wherein the specified bottom corner wall thickness of the body recess allows the second container to withstand the impact, the second container body having lateral body extensions configured to apply a compressive force on the first container body; and
        a supporting shelf disposed within the body recess and being spaced above the recess bottom corners, the supporting shelf being configured to support an underside of the first container body;
        the body recess being sized and configured to accommodate only a portion of the first container body such that a remaining portion of the first container body is exposed outside the body recess and protrudes outward beyond the second container body.

2. The container system of claim 1 wherein the second container body is fabricated from a plastic material.

3. The container system of claim 1 wherein the second container body has a generally cylindrical configuration.

4. The container system of claim 1 wherein the second container body has two opposing second body sides, the second container body further having proximal and distal parting lines formed on respective ones of the opposing second body sides and extending along the second body height.

5. The container system of claim 4 wherein the body recess is angularly offset approximately 90° from each of the parting lines.

6. The container system of claim 4 wherein the second container body comprises a handle extending along the body height, the handle being substantially aligned with the proximal parting line and being disposed substantially opposite from the distal parting line, the handle further being angularly offset approximately 90° from the body recess.

7. The container system of claim 1 wherein the lateral body extensions extend generally perpendicular to the second body height and extending partially into the body recess for capturing and retaining the portion of the first container body within the body recess.

8. The container system of claim 1 wherein the supporting shelf is disposed at a lower end of the body recess and extending generally perpendicular to the second body height.

9. The container system of claim 1 wherein the second body wall thickness and the recess bottom corner wall thickness range between about 0.01 inches and 0.2 inches.

10. A container system adapted to withstand an impact, the container system comprising:
    a cylindrical first container having a first container body; and
    a cylindrical second container, comprising:
        a second container body having a second body height and a second body wall thickness; and
        a body recess adapted to releasibly engage the first container body of the first container, the second container body including a plurality of lateral body extensions, each of the lateral body extensions being extended generally perpendicular to the second body height, each of the lateral body extensions further being extended partially into the body recess and being configured to apply at least one of a frictional and compressive force upon the first container body for retention thereof within the body recess, the body recess being formed on the second container body and extending along the second body height, the body recess defining a pair of recess bottom corners each having a recess bottom corner wall thickness which is greater than the second body wall thickness of the second container body, wherein the specified bottom corner wall thickness of the body recess allows the second container to withstand the impact;

a supporting shelf disposed within the body recess and having upper and lower surfaces, the lower surface of the supporting shelf being spaced above the recess bottom corners, the supporting shelf being configured to support an underside of the first container body;

wherein:

the second container body has a finger-indent adjacent a recess top portion for facilitating the detachment of the first container body from the body recess;

the body recess being configured such that the first container body protrudes outwardly beyond the second container body.

11. A container system adapted to withstand an impact, the container system comprising:

a first container having a first container body; and a second container, comprising:

a body recess;

a second container body having a second body height and a second body wall thickness, the second container body including a plurality of lateral body extensions, each of the lateral body extensions being extended generally perpendicular to the second body height, each of the lateral body extensions further being extended partially into the body recess and being configured to apply at least one of a frictional and compressive force upon the first container body for retention thereof within the body recess, the second container body further including a supporting shelf disposed at a lower end of the body recess for supporting a portion of the first container body thereupon; and the supporting shelf being disposed within the body recess in spaced relation to the recess bottom and being configured to support an underside of the first container body;

wherein:

the body recess is adapted to releasibly engage the first container body of the first container, the body recess being formed on the second container body and extending along the second body height, the body recess defining at least one recess bottom corner having a recess bottom corner wall thickness which is at least identical to the second body wall thickness of the second container body, wherein the specified bottom corner wall thickness of the body recess allows the second container to withstand the impact.

* * * * *